United States Patent
Sun et al.

(10) Patent No.: US 10,962,675 B2
(45) Date of Patent: Mar. 30, 2021

(54) SYSTEMS AND METHODS FOR IDENTIFYING SUBSURFACE FEATURES AS A FUNCTION OF POSITION IN A SUBSURFACE VOLUME OF INTEREST

(71) Applicant: CHEVRON U.S.A. INC., San Ramon, CA (US)

(72) Inventors: Boqin Sun, Houston, TX (US); Simon Clinch, Houston, TX (US); Dustin J. Keele, Houston, TX (US); Byron Dean Gulick, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 359 days.

(21) Appl. No.: 16/175,459

(22) Filed: Oct. 30, 2018

(65) Prior Publication Data
US 2020/0132876 A1  Apr. 30, 2020

(51) Int. Cl.
*G01V 3/38* (2006.01)
*G01V 3/30* (2006.01)
*E21B 47/003* (2012.01)
*E21B 47/13* (2012.01)

(52) U.S. Cl.
CPC .............. *G01V 3/38* (2013.01); *E21B 47/003* (2020.05); *E21B 47/13* (2020.05); *G01V 3/30* (2013.01); *G01V 2210/6244* (2013.01)

(58) Field of Classification Search
None
See application file for complete search history.

(56) References Cited

U.S. PATENT DOCUMENTS

2010/0277167 A1* 11/2010 Romero .............. G01R 33/383
324/303

OTHER PUBLICATIONS

Newberry, B.M., Grace, L.M., and Stief, D.O., 1996, Analysis of carbonate dual porosity systems from borehole eletriical images, SPE 35158. Permian Basin oil and gas recovery conference, Texas, Mar. 27-29, 1996.
Russell, S.D., Akbar, M., Vissapragada, B., and Walkden, G.M., 2002. Small-scale heterogeneity and permeability estimation from dipmeter and image logs for reservoir rock typing: Aptian Shuaiba Reservoir of Bu Hasa, Abu Dhabi. AAPG Bulletin, V86 (10), pp. 1709-1732.

* cited by examiner

*Primary Examiner* — Roy Y Yi
(74) *Attorney, Agent, or Firm* — Esplin & Associates, PC

(57) ABSTRACT

Exemplary implementations may: obtain subsurface relaxation time data specifying subsurface relaxation time values corresponding to a well in the subsurface volume of interest; generating a subsurface relaxation time distribution using the subsurface relaxation time data; generating a subsurface porosity distribution using the subsurface relaxation time distribution; generating a representation of the subsurface porosity distribution in the subsurface volume of interest using visual effects to depict at least one of the one or more subsurface relaxation time values; and display the representation.

17 Claims, 9 Drawing Sheets
(7 of 9 Drawing Sheet(s) Filed in Color)

SYSTEMS AND METHODS FOR IDENTIFYING SUBSURFACE FEATURES AS A FUNCTION OF POSITION IN A SUBSURFACE VOLUME OF INTEREST

FIELD OF THE DISCLOSURE

The present disclosure relates to systems and methods for identifying subsurface features as a function of position in a subsurface volume of interest.

SUMMARY

One aspect of the present disclosure relates to a method for identifying subsurface features as a function of position in a subsurface volume of interest. The method may include obtaining, from the electronic storage, subsurface relaxation time data specifying subsurface relaxation time values corresponding to a well in the subsurface volume of interest. The method may include generating, with the one or more physical computer processors, a subsurface relaxation time distribution using the subsurface relaxation time data. The subsurface relaxation time distribution may specify the subsurface relaxation time values as a function of porosity values. The subsurface relaxation time values may be sorted into one or more subsurface relaxation time bins. The method may include generating, with the one or more physical computer processors, a subsurface porosity distribution using the subsurface relaxation time distribution. The subsurface porosity distribution may sort the subsurface relaxation time values into one or more subsurface porosity bins. The method may include generating, with the one or more physical computer processors, a representation of the subsurface porosity distribution in the subsurface volume of interest using visual effects to depict at least one of the one or more subsurface relaxation time values. The method may include displaying, on the graphical user interface, the representation.

One aspect of the present disclosure relates to a system for identifying subsurface features as a function of position in a subsurface volume of interest. The system may include non-transient electronic storage, a graphical user interface, and one or more hardware processors configured by machine-readable instructions. The processor(s) may be configured to obtain, from the electronic storage, subsurface relaxation time data specifying subsurface relaxation time values corresponding to a well in the subsurface volume of interest. The processor(s) may be configured to generate a subsurface relaxation time distribution using the subsurface relaxation time data. The subsurface relaxation time distribution may specify the subsurface relaxation time values as a function of porosity values. The subsurface relaxation time values may be sorted into one or more subsurface relaxation time bins. The processor(s) may be configured to generate a subsurface porosity distribution using the subsurface relaxation time distribution. The subsurface porosity distribution may sort the relaxation time values into one or more subsurface porosity bins. The processor(s) may be configured to generating a representation of the subsurface porosity distribution in the subsurface volume of interest using visual effects to depict at least one of the one or more subsurface porosity bins. The processor(s) may be configured to display, on the graphical user interface, the representation.

One aspect of the present disclosure relates to a method for identifying subsurface features as a function of position in a subsurface volume of interest. The method may include obtaining, from the electronic storage, an imaging log representing a well in the subsurface volume of interest. The method may include generating, with the one or more physical computer processors, one or more estimated subsurface porosity bins using the imaging log. The method may include generating, with the one or more physical computer processors, a subsurface pore size distribution using the one or more estimated subsurface porosity bins for a position in the subsurface volume of interest. The subsurface pore size distribution may specify subsurface pore size values as a function of porosity values. The subsurface pore size values may be sorted into one or more subsurface pore size bins. The method may include generating, with the one or more physical computer processors, a subsurface porosity distribution using the subsurface pore size distribution. The subsurface porosity distribution may sort the subsurface relaxation time values into one or more refined subsurface porosity bins. The method may include generating, with the one or more physical computer processors, a representation of the subsurface porosity distribution in the subsurface volume of interest using visual effects to depict at least one of the one or more subsurface pore size values. The method may include displaying, on the graphical user interface, the representation.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the presently disclosed technology. As used in the specification and in the claims, the singular form of "a", "an", and "the" include plural referents unless the context clearly dictates otherwise.

The technology disclosed herein, in accordance with one or more various implementations, is described in detail with reference to the following figures. The drawings are provided for purposes of illustration only and merely depict typical or example implementations of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

BRIEF DESCRIPTION OF THE DRAWINGS

The patent or application contains at least one drawing executed in color. Copies of this patent or patent application publication with color drawing(s) will be provided by the Office upon request and payment of the necessary fee.

DETAILED DESCRIPTION

Nuclear magnetic resonance (NMR) logging is a technology used for subsurface formation evaluation due to its correspondence with formation porosity and pore size. In existing implementations, NMR logging may include log tracks to display relaxation times, porosity, and permeability. The problem with these tracks is that the peak intensity or incremental porosity in relaxation time distribution is very difficult to read and changes with a number of total relaxation time bins used in the distribution calculation. It is difficult to precisely determine porosity changes as a function of relaxation times. Often, color coding that may be used in existing bin porosity tracks are arbitrary and lack information on precise relaxation times for individual bins due to low bin resolution. It is difficult to use NMR logs for lithology identification. With such a complicated layout, it is very difficult to correlate formations in different wells for stratigraphy mapping.

Figure 3:
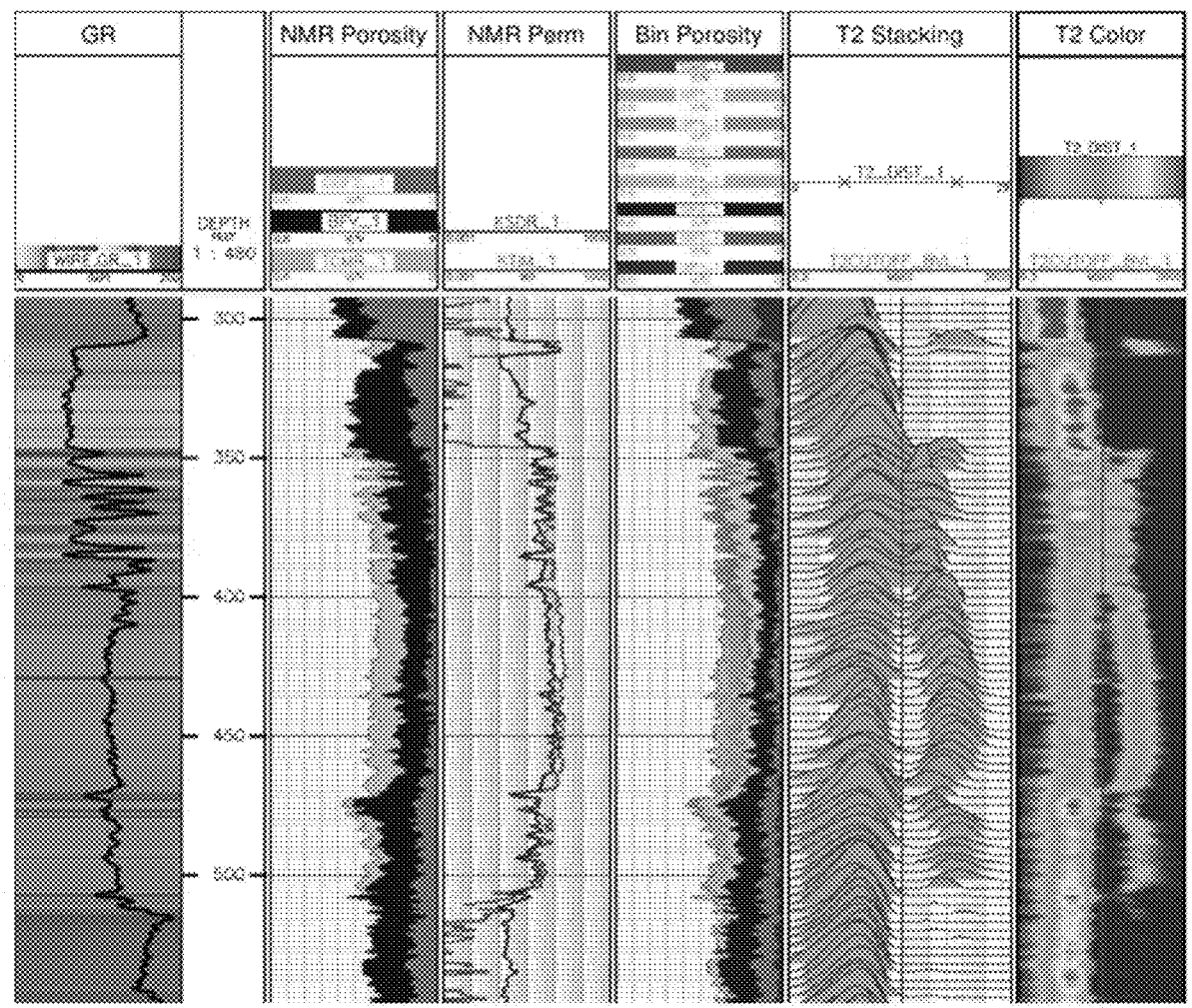
FIG. 3 illustrates a representation of an NMR log, in accordance with one or more implementations.

For example, FIG. 3 illustrates a representation of an NMR log, in accordance with one or more implementations. A first track may illustrate a gamma ray log which may indicate subsurface features. A second track may illustrate porosity values with three colors, gray, dark blue, and light blue. A third track may illustrate permeability. A fourth track may illustrate porosities calculated from different relaxation time cutoffs, such as, for example, 1, 3, 10, 33, 100, 300, 1000 ms. A fifth track may illustrate relaxation time distributions in a stacking plot. A sixth track may illustrate a relaxation time distribution using heat map colors. As illustrated, many tracks may be needed to present relevant information for a user.

Systems and methods configured to identify subsurface features as a function of position in a subsurface volume of interest. In implementations, subsurface relaxation time data may be collected, received, and/or obtained. The subsurface relaxation time data may be generated during NMR logging, as will be described herein. The subsurface relaxation time data may be used to generate a subsurface relaxation time distribution that specifies subsurface relaxation time values as a function of porosity values. The subsurface relaxation time distribution may be used to generate a subsurface porosity distribution that bins the subsurface relaxation time values into one or more subsurface porosity bins. A representation of the subsurface porosity distribution for a well in the subsurface volume of interest may be generated. The representation may map the subsurface relaxation time values to a color gradient, such that individual subsurface features of the subsurface volume of interest may be more easily illustrated to a user. The representation may be displayed.

In some implementations, the above may be repeated to generate multiple representations for multiple wells in the subsurface volume of interest. Displaying individual ones of the multiple representations together may present patterns to a user. These patterns may represent a stratigraphy of the subsurface volume of interest and/or correlations of subsurface features as a function of position across the subsurface volume of interest.

Figure 1:
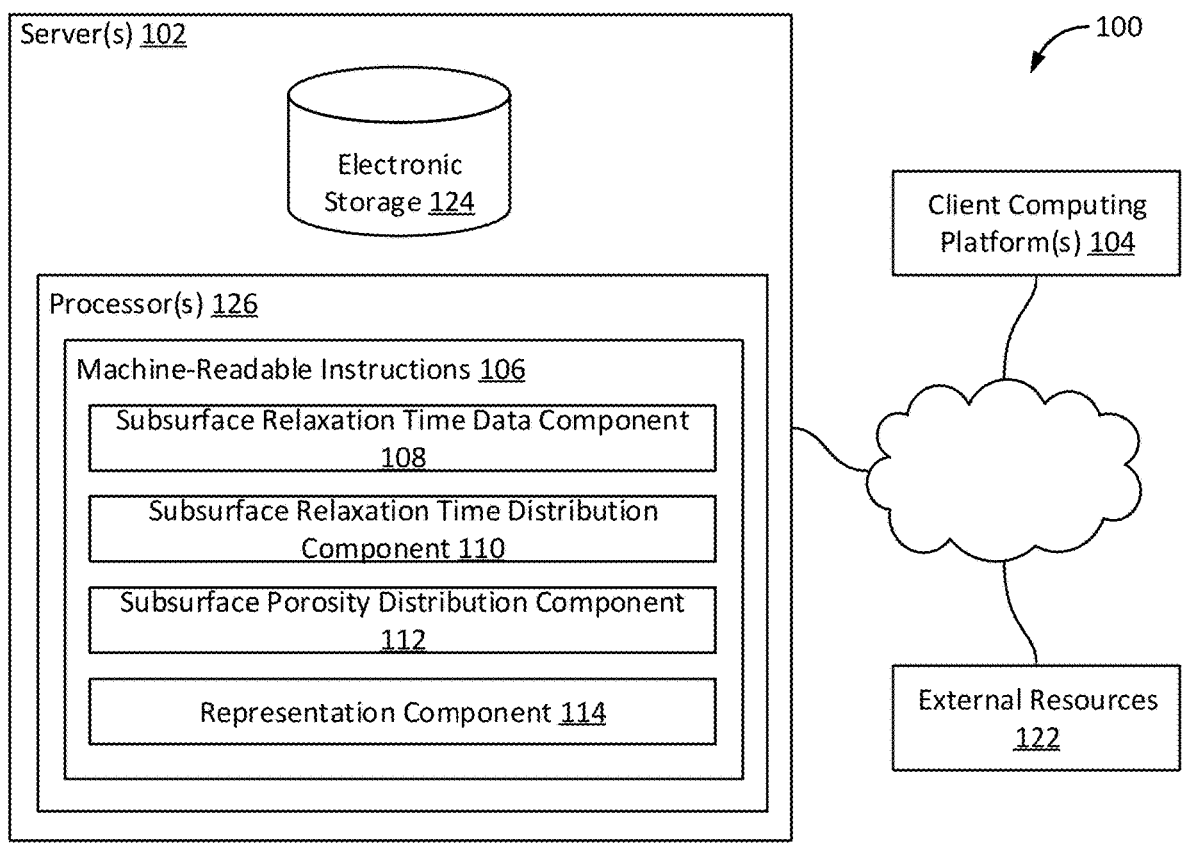
FIG. 1 shows a system configured to identify subsurface features as a function of position in a subsurface volume of interest, in accordance with one or more implementations.

FIG. 1 illustrates a system 100, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of a relaxation time data component 108, a relaxation time distribution component 110, a porosity distribution component 112, a representation component 114, and/or other instruction components.

Relaxation time data component 108 may be configured to obtain subsurface relaxation time data specifying subsurface relaxation time values corresponding to a well in the subsurface volume of interest. The subsurface relaxation time data may be obtained from the non-transient electronic storage and/or other sources. Subsurface relaxation time values may be used to determine pore-size information, pre-fluid properties, and/or other information. Subsurface relaxation time values may include $T_1$ and/or $T_2$ relaxation values. $T_1$ values may be longitudinal relaxation time values and $T_2$ values may be latitudinal relaxation time values.

Subsurface relaxation data may be generated and collected using NMR techniques. For example, an NMR device may use a magnet to generate a static magnetic field at the subsurface volume of interest that aligns the protons in pore fluid from their resting state to the static magnetic field. Once the protons are aligned, the static magnetic field may be turned off. As the protons return to their original states, they may lose energy over time, which is what the NMR device may measure.

In implementations, the NMR device may include pulse NMR devices to apply a sequential number of pulses (e.g. radio frequency (RF) pulses). The initial intensity of a signal may be proportional to the porosity of the subsurface volume of interest. The decay of the signal may reflect the property of fluid and its interaction with a solid matrix or pore size in the subsurface volume of interest. For example, a smaller subsurface relaxation time value may correspond to a smaller pore size. Subsurface relaxation time value may be used to estimate a quality of a reservoir seal.

In one example, NMR logging may measure the induced magnet moment of protons, such as hydrogen nuclei, which are contained within a fluid-filled pore space of porous media, such as reservoir rocks. In implementations, $T_1$ values may measure the time taken for a net magnetization to return to its initial maximum value. $T_2$ values may measure the time taken for a transverse component of magnetization to decay and/or dephase.

Relaxation time distribution component 110 may be configured to generate a subsurface relaxation time distribution using the subsurface relaxation time data. This may be accomplished by one or more physical computer processors. The subsurface relaxation time distribution may specify the subsurface relaxation time values as a function of porosity values. The subsurface relaxation time values may be sorted into one or more subsurface relaxation time bins. In some implementations, the subsurface relaxation time values may be binned on an x-axis into equally spaced bins between a minimum and a maximum subsurface relaxation time value. In implementations, the x-axis may use a logarithmic scale. In one example, a minimum subsurface relaxation time value may be about 0.3 ms and a maximum subsurface relaxation time value may be about 3000 ms. It should be appreciated that other minimum and maximum subsurface relaxation time values may be used in different circumstances. The y-axis may illustrate an incremental porosity at individual bins, representing a percentage of pores that may have about the same subsurface relaxation times.

Figure 4:
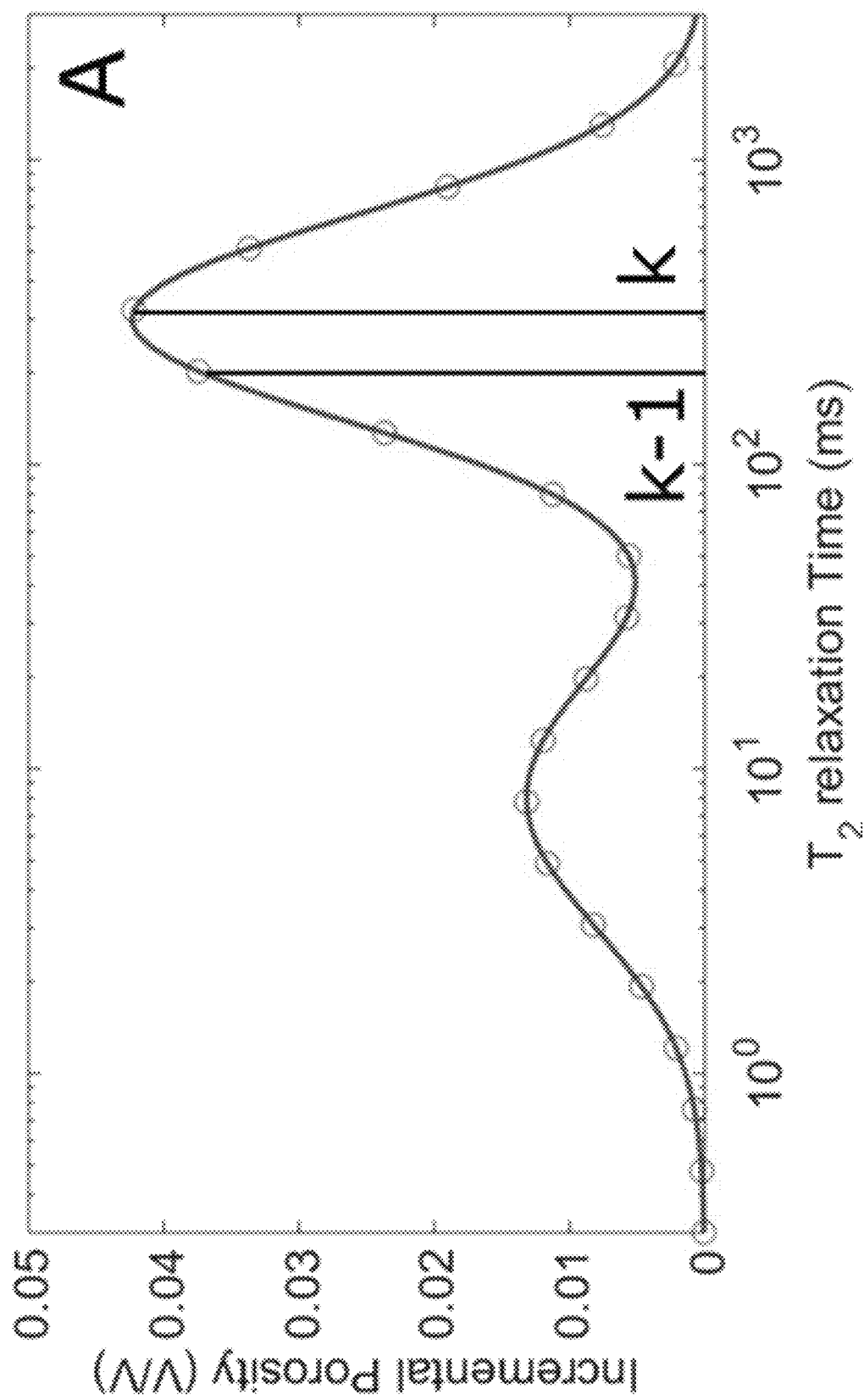
FIG. 4 illustrates a subsurface relaxation time distribution, in accordance with one or more implementations.

For example, FIG. 4 illustrates a subsurface relaxation time distribution, in accordance with one or more implementations. As illustrated, the x-axis represents a log scale of $T_2$ relaxation times and the y-axis represents incremental porosity. The red circles may represent the bins of the $T_2$ relaxation times.

Figure 5:
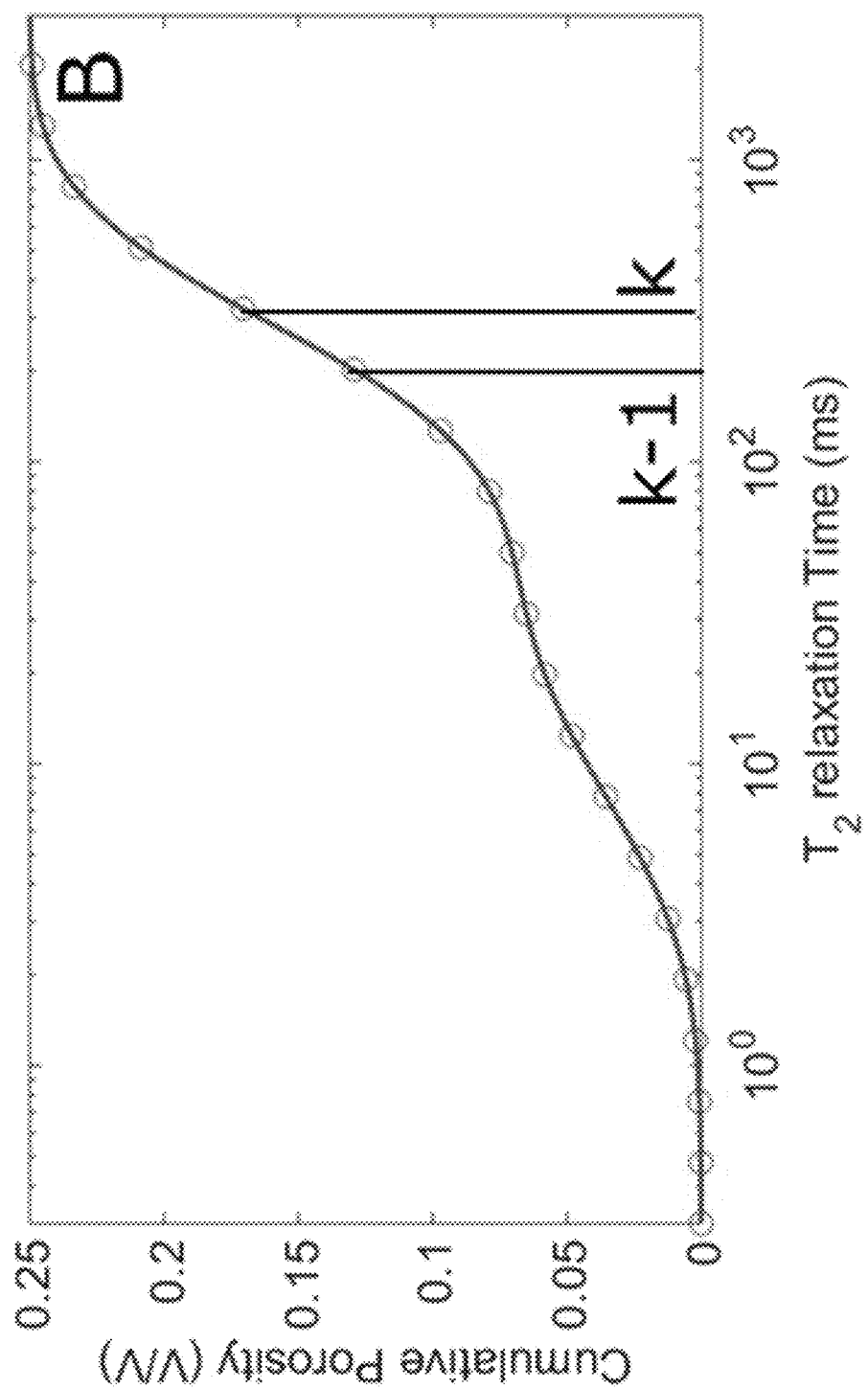
FIG. 5 illustrates a cumulative subsurface porosity distribution, in accordance with one or more implementations.

In some implementations, relaxation time distribution component 110 may be configured to generate a cumulative subsurface relaxation time distribution using a subsurface relaxation time distribution. FIG. 5 may illustrate a cumulative subsurface relaxation time distribution, in accordance with one or more implementations. The cumulative subsurface relaxation time distribution may be similar to the subsurface relaxation time distribution of FIG. 4, except the y-axis represents cumulative porosity.

In implementations, the subsurface relaxation time distribution may be used to generate a subsurface pore size distribution. Using the correspondence between subsurface relaxation time and subsurface pore size, subsurface pore size data may be generated from the subsurface relaxation time data to generate a subsurface pore size distribution.

Referring back to FIG. 1, porosity distribution component 112 may be configured to generate a subsurface porosity distribution using the subsurface relaxation time distribution. This may be accomplished by the one or more physical computer processors. The subsurface porosity distribution may sort the subsurface relaxation time values into one or more subsurface porosity bins. In some implementations, the number of subsurface porosity bins may be greater than 1000. It should be appreciated that a different number of subsurface porosity bins may be used for different applications.

One or more of the subsurface relaxation time values may correspond to a porosity feature. By way of non-limiting example, the porosity feature may include clay bound fluid, capillary bound fluid, and movable fluid in large pores. In some implementations, the one or more subsurface porosity bins may be equally spaced in the subsurface porosity distribution.

Figure 6:
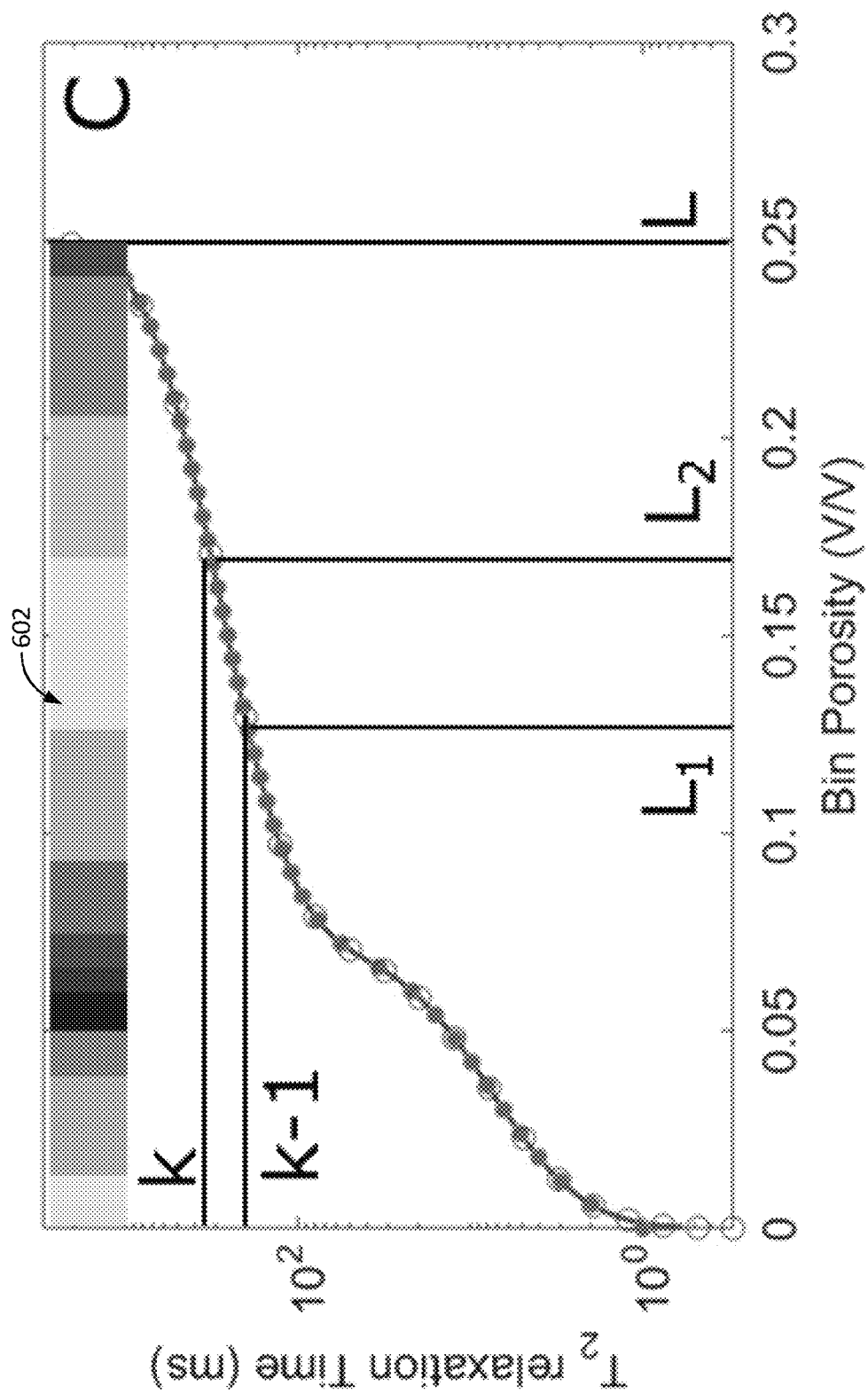
FIG. 6 illustrates a subsurface porosity distribution, in accordance with one or more implementations.

For example, FIG. 6 may illustrate a subsurface porosity distribution, in accordance with one or more implementations. Subsurface porosity bins may be on an x-axis in a linear scale. In some implementations, the total number of subsurface porosity bins may be about 1000. It should be appreciated that more or less subsurface porosity bins may be used for different applications. In implementations, the subsurface porosity bins may be equally spaced between the minimum and the maximum subsurface porosity bin value. A minimum subsurface porosity bin value may be about 0 and a maximum subsurface porosity bin value may be about 0.5 V/V. The corresponding subsurface relaxation time values may be calculated based on the subsurface porosity bin and represented on the y-axis. Color bar 602 may represent how the subsurface relaxation time values may be visually represented.

In some implementations, referring back to FIG. 1, porosity distribution component 112 may be configured to generate a subsurface porosity distribution using a subsurface pore size distribution. This may be accomplished by the one or more physical computer processors. Using sequential pulsed signals in a logging pass, a representation may be generated of subsurface relaxation time values. Bin resistivity (or conductivity) from borehole imaging log can be converted to apparent bin porosity using Archie's equation:

$$S_w^n = \frac{R_w}{\Phi^m \times R_t},$$

where $S_w$ is the water saturation of an uninvaded volume of interest, n is a saturation exponent (e.g., about 1.8 to about 4.0), $R_w$ is a formation water resistivity at a formation temperature, phi is a subsurface porosity value, m is a cementation exponent (e.g., around 1.7 to about 3.0), and $R_t$ is a true resistivity of the uninvaded volume of interest, corrected for multiple effects (e.g., invasion, borehole, thin bed, and/or other effects). The histogram of the apparent bin porosities at a given depth can be calibrated to form a pore size distribution. The true bin porosity may be displayed as a function of pore size, similar to the subsurface relaxation time distribution described herein. Using the correspondence between subsurface pore size and subsurface relaxation time values, a subsurface pore size distribution may be generated. As described above, the subsurface porosity distribution may sort the subsurface relaxation time values into one or more subsurface porosity bins.

Representation component 114 may be configured to generate a representation of the subsurface porosity distribution in the subsurface volume of interest using visual effects to depict at least one of the one or more subsurface porosity bins. This may be accomplished by the one or more physical computer processors. In implementations, the representation may depict subsurface relaxation time values increasing as the subsurface porosity bin value increases. In some implementations, the representation may depict subsurface relaxation time values decreasing as the subsurface porosity bin value increases. In implementations, a visual effect may include one or more visual transformations of the representation. A visual transformation may include one or more visual changes in how the representation is presented or displayed. In some implementations, a visual transformation may include one or more of a color gradient, a visual zoom, a visual filter, a visual rotation, and/or a visual overlay (e.g., text and/or graphics overlay).

Figure 7A:
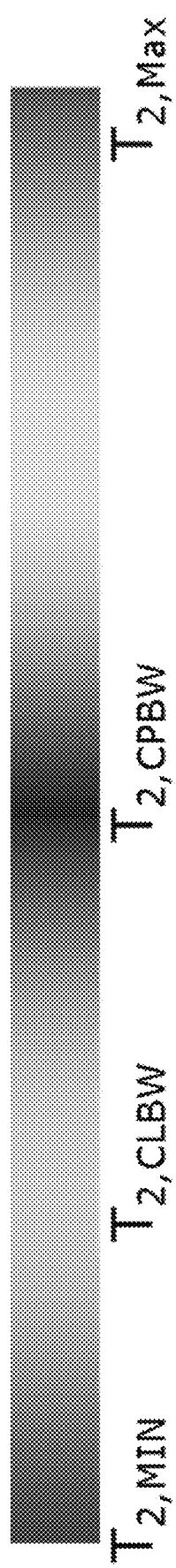
FIG. 7A illustrates multiple color gradients, in accordance with one or more implementations.
Figure 7B:
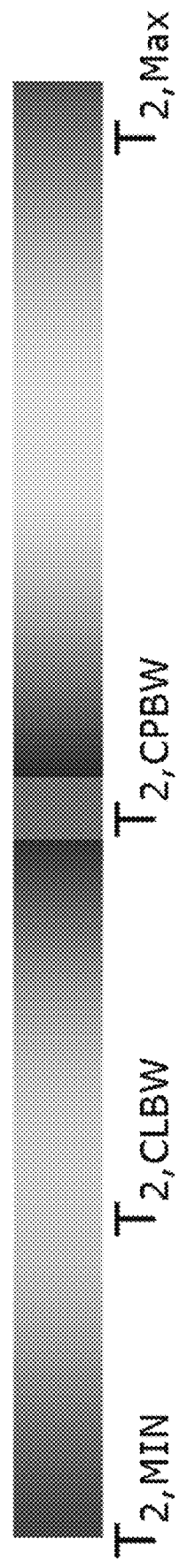
FIG. 7B illustrates multiple color gradients, in accordance with one or more implementations.

In implementations, one or more subsurface relaxation time values may be mapped to a color gradient. For example, FIG. 7A and 7B illustrate multiple color gradients, in accordance with one or more implementations. Referring to FIG. 7A, a gray gradient, a blue gradient, and a green-yellow-red gradient are depicted. The gray gradient may represent subsurface relaxation time values between a minimum subsurface relaxation time value and a first subsurface relaxation time threshold value. This range of subsurface relaxation time values may correspond to a first porosity feature, such as, for example, clay bound fluid (e.g., about 0 ms to about 3 ms). The blue gradient may represent subsurface relaxation time values between a first subsurface relaxation time threshold value and a second subsurface relaxation time threshold value. This range of subsurface relaxation time values may correspond to a second porosity feature, such as, for example, capillary bound fluid (e.g., about 3 ms to about 33 ms). The green-yellow-red gradient may represent subsurface relaxation time values between a second subsurface relaxation time threshold value and a maximum subsurface relaxation time value. This range of subsurface relaxation time values may correspond to a third porosity feature, such as, for example, capillary bound fluid (e.g., about 33 ms to a maximum subsurface relaxation time value). The green gradient may correspond to heavy oil and the red gradient may correspond to gas or lighter oil. It should be appreciated that other colors and thresholds, as well as more or less thresholds, may be used for different applications. For example, FIG. 7B includes a brown color between about 10 ms to about 60 ms to indicate mud.

Representation component 114 may be configured to display the representation. The representation may be displayed on a graphical user interface and/or other displays. The representation may allow a user to determine one or more subsurface features (e.g., porosity, saturation, fluid property, lithology, and/or other subsurface features). For example, the porosity may be directly represented on the subsurface porosity distribution; the saturation, fluid property, and lithology may be determined based on the subsurface relaxation time values that correspond to a color gradient. In some implementations, multiple representations may be displayed for one or more wells in the subsurface volume of interest.

Figure 8:
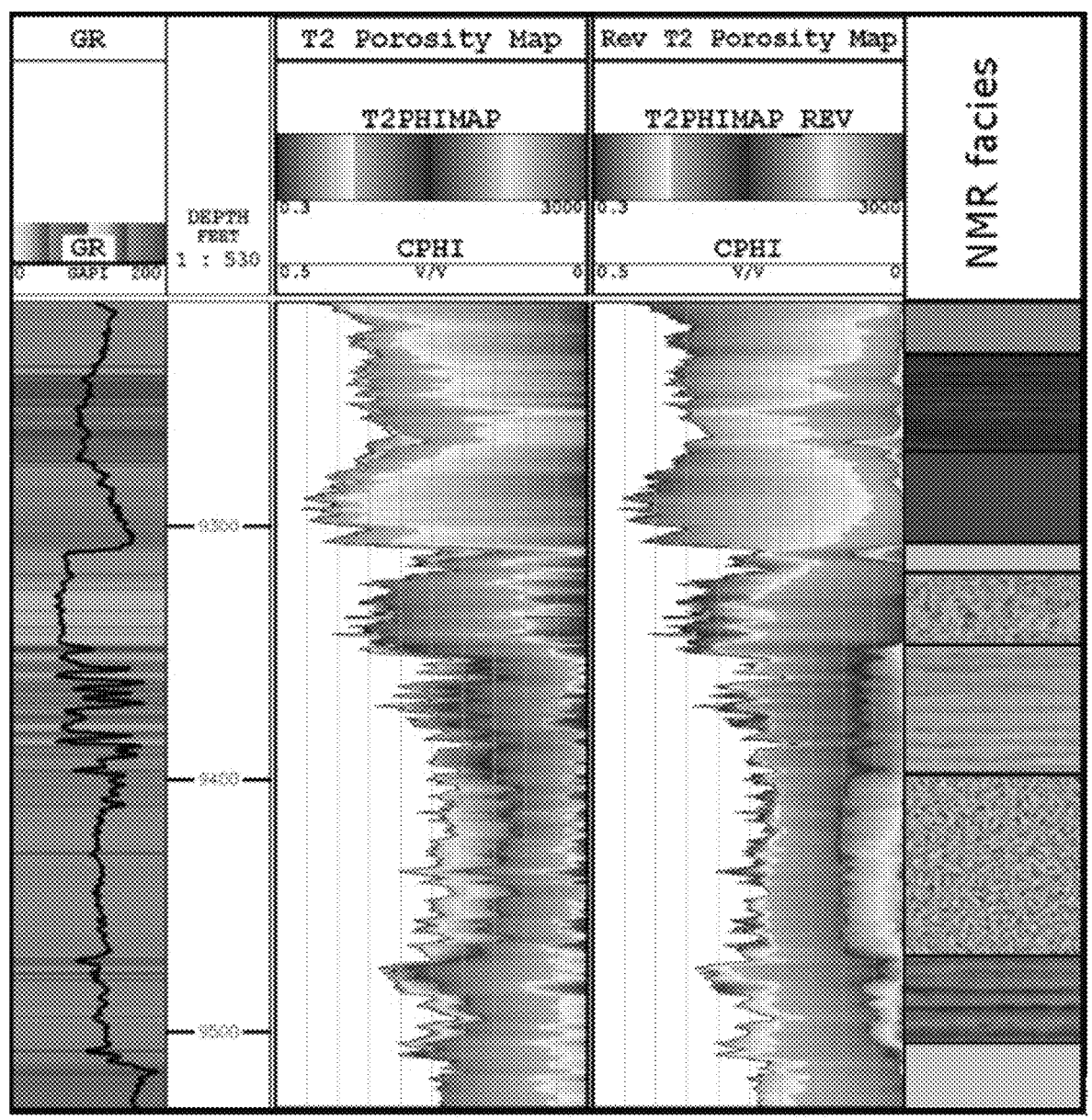
FIG. 8 illustrates a representation, in accordance with one or more implementations.

FIG. 8 illustrates a representation, in accordance with one or more implementations. The representation may include one or more tracks. A first track may illustrate a gamma ray log with colors to indicate subsurface feature variation. A second track may illustrate a subsurface porosity distribution where subsurface relaxation time values increase as the subsurface porosity bin value increases, as described above. As illustrated, the green-yellow-red gradient is at the left of the subsurface porosity distribution. A third track may illustrate a subsurface porosity distribution where subsurface relaxation time values decrease as the subsurface porosity bin value increases, as described above. As illustrated, the green-yellow-red gradient is at the right of the subsurface porosity distribution which may more easily highlight changes in subsurface features. A fourth track may illustrate subsurface features based on one or more of the subsurface porosity distributions.

Referring back to FIG. 1, in implementations, representation component 114 may be configured to identify correlations between multiple wells based on visual effects between multiple representations as a function of position of the one or more wells in the subsurface volume of interest. Correlations may include subsurface features, porosity features, and/or other correlations. In some implementations, object recognition algorithms, pattern recognition algorithms, and/or machine learning techniques may be used to identify correlations between the multiple representations based on correlations between the multiple representations. In implementations, when a correlation is identified, a notification may be generated identifying the correlation.

Figure 9:
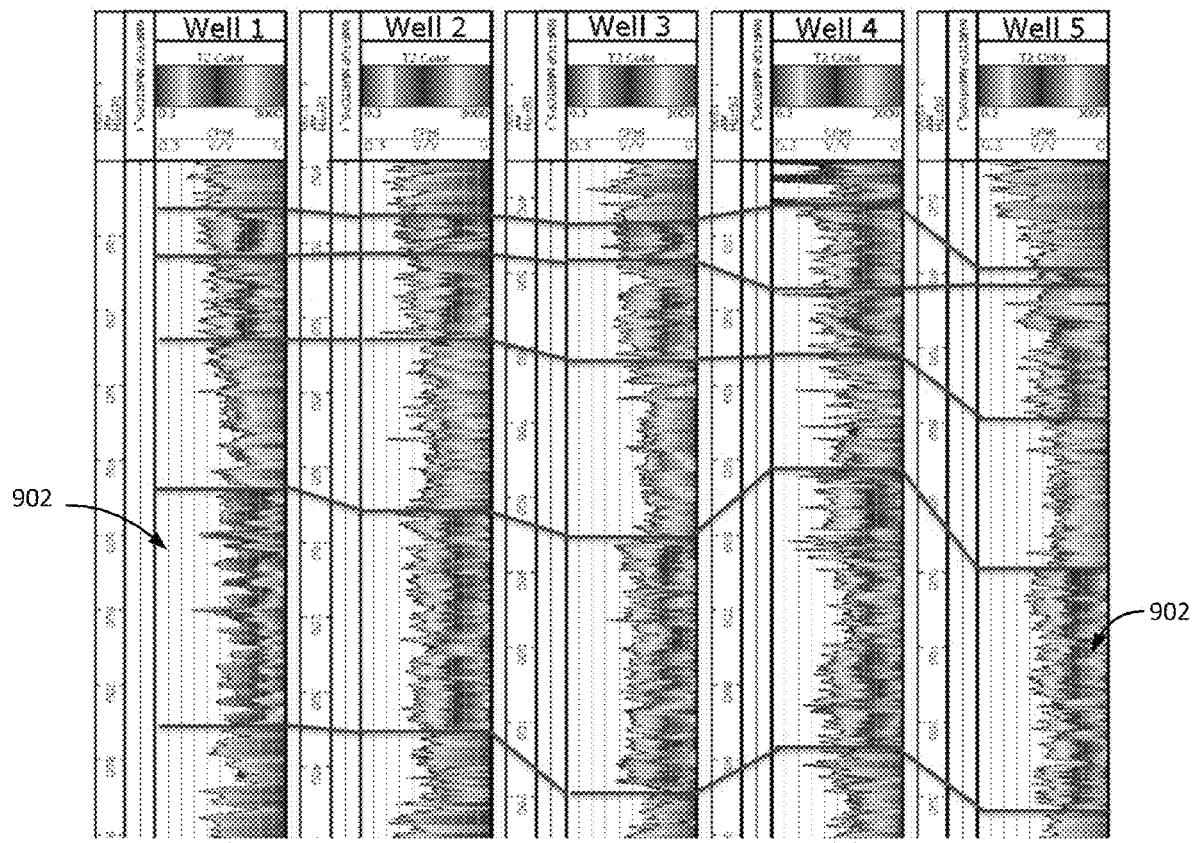
FIG. 9 illustrates multiple representation of a subsurface volume of interest, in accordance with one or more implementations.

For example, FIG. 9 illustrates multiple representations, in accordance with one or more implementations. Wells 1 through 5 may be wells in a subsurface volume of interest. Comparing the representations together may allow a user to identify subsurface features as a function of position, as well as quality check data corresponding to individual wells. As illustrated, portion 902 of well 1 is much more green than the other corresponding portions of wells 2 through 5, and portion 902 is less smooth than the other corresponding portions of wells 2 through 5. This may indicate subsurface feature changes or data collection issues.

In some implementations, server(s) 102, client computing platform(s) 104, and/or external resources 122 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 122 may be operatively linked via some other communication media.

A given client computing platform 104 may include one or more processors configured to execute computer program components. The computer program components may be configured to enable an expert or user associated with the given client computing platform 104 to interface with system 100 and/or external resources 122, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 122 may include sources of information outside of system 100, external entities participating with system 100, and/or other resources. In some implementations, some or all of the functionality attributed herein to external resources 122 may be provided by resources included in system 100.

Server(s) 102 may include electronic storage 124, one or more processors 126, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 124 may include non-transitory storage media that electronically stores information. The electronic storage media of electronic storage 124 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 124 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 124 may include one or more virtual storage resources (e.g., cloud storage, a virtual private network, and/or other virtual storage resources). Electronic storage 124 may store software algorithms, information determined by processor(s) 126, information received from server(s) 102, information received from client computing platform(s) 104, and/or other information that enables server(s) 102 to function as described herein.

Processor(s) 126 may be configured to provide information processing capabilities in server(s) 102. As such, processor(s) 126 may include one or more of a digital processor, an analog processor, a digital circuit designed to process information, an analog circuit designed to process information, a state machine, and/or other mechanisms for electronically processing information. Although processor(s) 126 is shown in FIG. 1 as a single entity, this is for illustrative purposes only. In some implementations, processor(s) 126 may include a plurality of processing units. These processing units may be physically located within the same device, or processor(s) 126 may represent processing functionality of a plurality of devices operating in coordination. Processor(s) 126 may be configured to execute components 108, 110, 112, and/or 114, and/or other components. Processor(s) 126 may be configured to execute components 108, 110, 112, and/or 114, and/or other components by software; hardware; firmware; some combination of software, hardware, and/or firmware; and/or other mechanisms for configuring processing capabilities on processor(s) 126. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 1 as being implemented within a single processing unit, in implementations in which processor(s) 126 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As one example, processor(s) 126 may be configured to execute one or more additional components that may perform some or all of the functionality attributed below to one of components 108, 110, 112, and/or 114.

Figure 2:
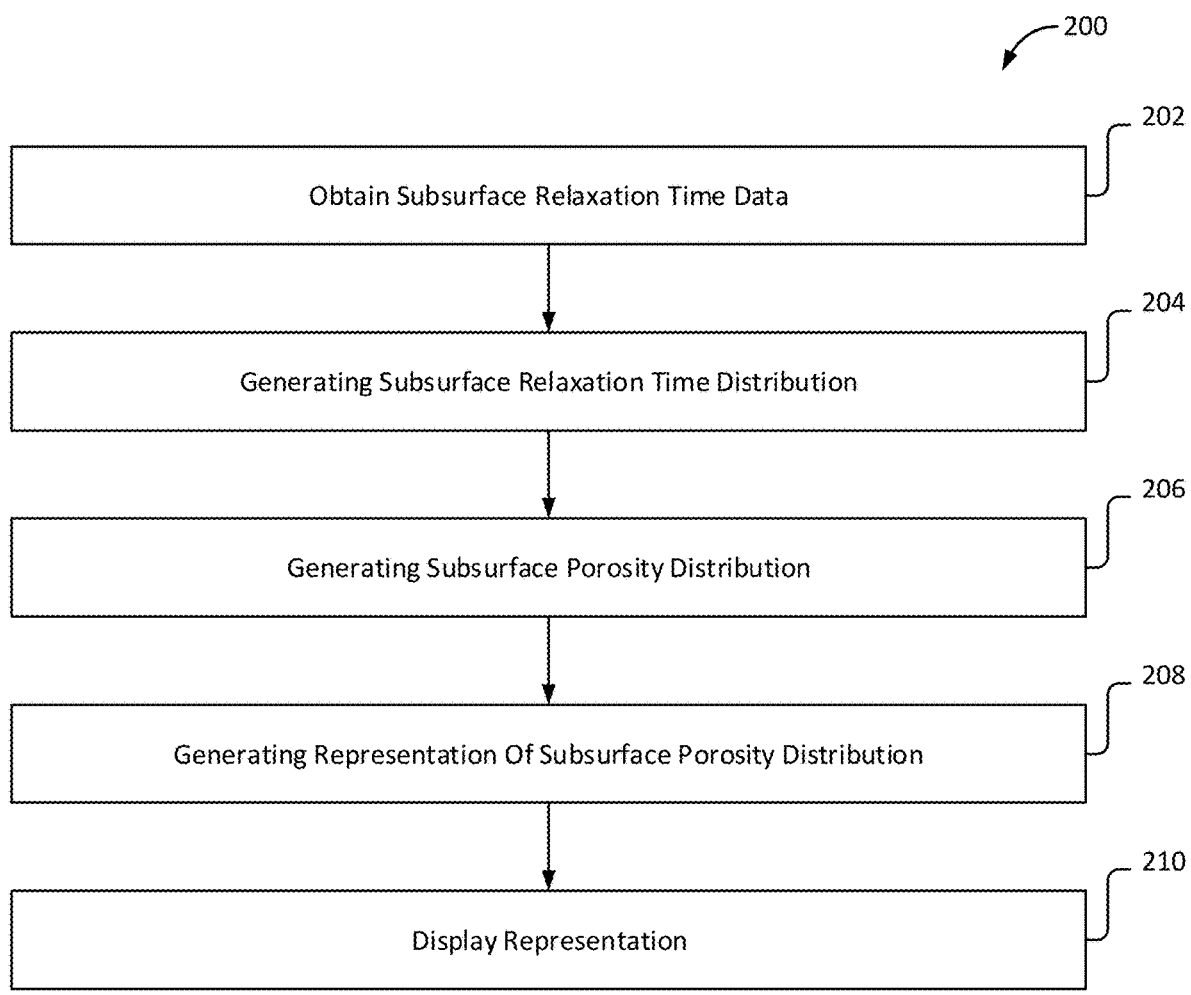
FIG. 2 includes a flow chart of a method to identify subsurface features as a function of position in a subsurface volume of interest, in accordance with one or more implementations.

FIG. 2 illustrates a method 200 for identifying subsurface features as a function of position in a subsurface volume of interest, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a physical computer processor, a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining, from the electronic storage, subsurface relaxation time data specifying subsurface relaxation time values corresponding to a well in the subsurface volume of interest. Operation 202 may be performed by one or more hardware processors configured by machine-readable instructions including a component that is the same as or similar to relaxation time data component 108, in accordance with one or more implementations.

An operation 204 may include generating, with the one or more physical computer processors, a subsurface relaxation time distribution using the subsurface relaxation time data. The subsurface relaxation time distribution may specify the subsurface relaxation time values as a function of porosity values. The subsurface relaxation time values may be sorted into one or more subsurface relaxation time bins. In some implementations, the subsurface relaxation time values may be used to generate pore size distributions, as described above. Operation 204 may be performed by one or more hardware processors configured by machine-readable instructions including a component that is the same as or similar to relaxation time distribution component 110, in accordance with one or more implementations.

An operation 206 may include generating, with the one or more physical computer processors, a subsurface porosity distribution using the subsurface relaxation time distribution. The subsurface porosity distribution may sort the subsurface relaxation time values into one or more subsurface porosity bins. In some implementations, the subsurface pore size distribution may be used to generate the subsurface porosity distribution, as described above. Operation 206 may be performed by one or more hardware processors configured by machine-readable instructions including a component that is the same as or similar to porosity distribution component 112, in accordance with one or more implementations.

An operation 208 may include generating, with the one or more physical computer processors, a representation of the subsurface porosity distribution in the subsurface volume of interest using visual effects to depict at least one of the subsurface relaxation time values. In some implementations, the visual effects may include mapping the subsurface relaxation time values corresponding to a given porosity feature to a given color gradient. Operation 208 may be performed by one or more hardware processors configured by machine-readable instructions including a component that is the same as or similar to representation component 114, in accordance with one or more implementations.

An operation 210 may include displaying, on the graphical user interface, the representation. Operation 210 may be performed by one or more hardware processors configured by machine-readable instructions including a component that is the same as or similar to representation component 114, in accordance with one or more implementations.

In implementations, operations 202 through 210 may be repeated for multiple wells in the subsurface volume of interest. The multiple representations may be displayed together on the graphical user interface. A user may identify correlations between the multiple representations. In some implementations, object and pattern recognition algorithms may be used to identify correlations between the multiple representations. In implementations, when a correlation is identified, a notification may be generated identifying the correlation.

In one example, a method for identifying subsurface features as a function of position in a subsurface volume of interest may include generating a subsurface relaxation time distribution, as described above.

Equally spaced $T_2$ bins in logarithmic scale: $T_{2,1}$, $T_{2,2}, \ldots, T_{2,N}$, Porosity increments: $a_1, a_2, \ldots, a_N$  (1)

In equation (1), N is the total number of subsurface $T_2$ bins and may be between about 30 and about 100. $T_{2,1}=T_{2,MIN}$ and $T_{2,N}=T_{2,MAX}$. A subsurface $T_{2,MIN}$ value may be about 0.3 ms and a subsurface $T_{2,MAX}$ may be about 3000 ms. A subsurface $T_2$ porosity distribution may be generated using a subsurface $T_2$ distribution by generating equally spaced subsurface porosity bins in linear scale. Subsurface $T_2$ values may be calculated for individual subsurface porosity bins. Therefore, the subsurface $T_2$ porosity distribution can be represented by Porosity bins: $P_1, P_2, \ldots, P_M$, $T_2$ values: $\tau_{2,1}, \tau_{2,2}, \ldots, \tau_{2,M}$.  (2)

In equation (2), we use $T_{2,i}$ (i=1,2, ..., M) to represent the ith subsurface $T_2$ value of the ith subsurface porosity bin. M is the total number of subsurface porosity bins with a value of about 1000 (to keep the accuracy of porosity within 0.1 PU). $P_1=0$ and $P_M=P_{MAX}$ with a value of about 0.5 V/V. Over the whole logging interval, the subsurface porosity bin values are equally spaced between 0 and $P_{MAX}$ and are calculated by $$P_l = \frac{P_{MAX}}{M-1}(l-1) \text{ for } l = 1, 2, \ldots, M \quad (3)$$

and one or more subsurface $T_2$ values corresponds to a color gradient. The following may describe a normal mode subsurface $T_2$ porosity distribution, where $T_{2,1} \leq T_{2,M}$. In reserve mode $T_{2,1} \geq T_{2,M}$, but the same method can be used to derive a reverse mode subsurface $T_2$ porosity distribution.

Assuming the total subsurface porosity log is $\phi_t$, it equals to the sum of all incremental subsurface porosities, that is, $$\phi_t = \sum_{i=1}^{N} b_i \approx P_L, \text{ where } L \leq M, L = \text{int}\left(\frac{P_L}{P_{MAX}}(M-1)+1\right), \quad (4)$$

and $$b_i = \frac{a_i}{A}\phi_t, \text{ and} \quad (5)$$

$$A = \sum_{i=1}^{N} a_i. \quad (6)$$

For the (k−1)th and kth $T_2$ bins in the subsurface $T_2$ distribution, the corresponding subsurface porosity bins are given by $P_{L1} = \sum_{i=1}^{k-1} b_i$ $P_{L2} = \sum_{i=1}^{k} b_i$.  (7)

Since all subsurface porosity bins are equally spaced between 0 and $P_{MAX}$, the indices $L_1$ and $L_2$ can be calculated by $$L_1 = \text{int}\left(\frac{P_{L_1}}{P_{MAX}}(M-1)+1\right) \quad (8)$$

$$L_2 = \text{int}\left(\frac{P_{L_2}}{P_{MAX}}(M-1)+1\right)$$

The $T_2$ values can be calculated by $$\tau_{2,l} = T_{2,k-1} + \frac{T_{2,k} - T_{2,k-1}}{L_2 - L_1}(l - L_1) \text{ for} \quad (9)$$

$l = L_1, L_1 + 1, \ldots, L_2$ or $\tau_{2,l} = NaN$ for $l = L+1, L+2, \ldots, M$ $$\tau_{2,l} = \exp\left(\ln(T_{2,k-1}) + \frac{\ln(T_{2,k}) - \ln(T_{2,k-1})}{L_2 - L_1}(l - L_1)\right) \text{ for} \quad (10)$$

$l = L_1, L_1 + 1, \ldots, L_2$ $\tau_{2,l} = NaN$ for $l = L+1, L+2, \ldots, M$ Equations (2), (3), and (9) or (10) define an example subsurface $T_2$ porosity distribution.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A computer-implemented method for identifying subsurface features as a function of position in a subsurface volume of interest, the method being implemented in a computer system that includes one or more physical computer processors, non-transient electronic storage, and a graphical user interface, comprising:

a) obtaining, from the electronic storage, subsurface relaxation time data specifying subsurface relaxation time values corresponding to a well in the subsurface volume of interest;

b) generating, with the one or more physical computer processors, a subsurface relaxation time distribution using the subsurface relaxation time data, wherein the subsurface relaxation time distribution specifies the subsurface relaxation time values as a function of porosity values; and wherein the subsurface relaxation time values are sorted into one or more subsurface relaxation time bins;

c) generating, with the one or more physical computer processors, a subsurface porosity distribution using the subsurface relaxation time distribution, wherein the subsurface porosity distribution sorts the subsurface relaxation time values into one or more subsurface porosity bins;

d) generating, with the one or more physical computer processors, a representation of the subsurface porosity distribution in the subsurface volume of interest using visual effects to depict at least one of the subsurface relaxation time values;

e) displaying, on the graphical user interface, the representation;

f) repeating, with the one or more physical computer processors, steps (a)-(e) to generate and display, on the graphical user interface, multiple representations corresponding to one or more wells in the subsurface volume of interest; and g) identifying, with the one or more physical computer processors, correlations between the one or more wells based on visual effects between the multiple representations as a function of position in the one or more wells.

2. The computer-implemented method of claim 1, wherein one or more of the subsurface relaxation time values correspond to a porosity feature.

3. The computer-implemented method of claim 2, wherein the porosity feature comprises clay bound fluid, capillary bound fluid, and movable fluid in large pores.

4. The computer-implemented method of claim 1, wherein the visual effects comprise mapping the subsurface relaxation time values corresponding to a given porosity feature to a given color gradient.

5. The computer-implemented method of claim 1, wherein the representation depicts subsurface relaxation time values increasing as the subsurface porosity bin value increases.

6. The computer-implemented method of claim 1, wherein the representation depicts subsurface relaxation time values decreasing as the subsurface porosity bin value increases.

7. The computer-implemented method of claim 1, wherein the one or more subsurface porosity bins are equally spaced in the subsurface porosity distribution.

8. A system configured for identifying subsurface features as a function of position in a subsurface volume of interest, the system comprising:
   non-transient electronic storage;
   a graphical user interface; and
   one or more physical computer processors configured by machine-readable instructions to:
   a) obtain, from the electronic storage, subsurface relaxation time data specifying subsurface relaxation time values corresponding to a well in the subsurface volume of interest;
   b) generate, with the one or more physical computer processors, a subsurface relaxation time distribution using the subsurface relaxation time data, wherein the subsurface relaxation time distribution specifies the subsurface relaxation time values as a function of porosity values; and wherein the subsurface relaxation time values are sorted into one or more subsurface relaxation time bins;
   c) generate, with the one or more physical computer processors, a subsurface porosity distribution using the subsurface relaxation time distribution, wherein the subsurface porosity distribution sorts the subsurface relaxation time values into one or more subsurface porosity bins;
   d) generate, with the one or more physical computer processors, a representation of the subsurface porosity distribution in the subsurface volume of interest using visual effects to depict at least one of the subsurface relaxation time values;
   e) display, on the graphical user interface, the representation;
   f) repeat, with the one or more physical computer processors, steps (a)-(e) to generate and display, on the graphical user interface, multiple representations corresponding to one or more wells in the subsurface volume of interest; and
   g) identify, with the one or more physical computer processors, correlations between the one or more wells based on visual effects between the multiple representations as a function of position in the one or more wells.

9. The system of claim 8, wherein one or more of the subsurface relaxation time values correspond to a porosity feature.

10. The system of claim 9, wherein the porosity feature comprises clay bound fluid, capillary bound fluid, and movable fluid in large pores.

11. The system of claim 8, wherein the visual effects comprise mapping the subsurface relaxation time values corresponding to a given porosity feature to a given color gradient.

12. The system of claim 8, wherein the representation depicts subsurface relaxation time values increasing as the subsurface porosity bin value increases.

13. The system of claim 8, wherein the representation depicts subsurface relaxation time values decreasing as the subsurface porosity bin value increases.

14. The system of claim 8, wherein the one or more subsurface porosity bins are equally spaced in the subsurface porosity distribution.

15. A computer-implemented method for identifying subsurface features as a function of position in a subsurface volume of interest, the method being implemented in a computer system that includes one or more physical computer processors, non-transient electronic storage, and a graphical user interface, comprising:
   a) obtaining, from the electronic storage, an imaging log representing a well in the subsurface volume of interest;
   b) generating, with the one or more physical computer processors, one or more estimated subsurface porosity bins using the imaging log;
   c) generating, with the one or more physical computer processors, a subsurface pore size distribution using the one or more estimated subsurface porosity bins for a position in the subsurface volume of interest, wherein the subsurface relaxation time distribution specifies subsurface pore size values as a function of porosity values; and wherein the subsurface pore size values are sorted into one or more subsurface pore size bins;
   d) generating, with the one or more physical computer processors, a subsurface porosity distribution using the subsurface pore size distribution, wherein the subsurface pore size distribution sorts subsurface pore size values into one or more subsurface porosity bins;
   e) generating, with the one or more physical computer processors, a representation of the subsurface pore size distribution in the subsurface volume of interest using visual effects to depict at least one of the subsurface pore size values;
   f) displaying, on the graphical user interface, the representation;
   g) repeating, with the one or more physical computer processors, steps (a)-(f) to generate and display, on the graphical user interface, multiple representations corresponding to one or more wells in the subsurface volume of interest; and
   h) identifying, with the one or more physical computer processors, correlations between the one or more wells based on visual effects between the multiple representations as a function of position in the one or more wells.

16. The computer-implemented method of claim 15, wherein one or more of the subsurface relaxation time values correspond to a porosity feature, and wherein the porosity feature comprises clay bound fluid, capillary bound fluid, and movable fluid in large pores.

17. The computer-implemented method of claim 15, wherein the one or more subsurface porosity bins are equally spaced in the subsurface porosity distribution.

* * * * *